United States Patent [19]

Fankhauser, II et al.

[11] Patent Number: 4,942,642
[45] Date of Patent: Jul. 24, 1990

[54] DEBONING SYSTEM AND METHOD OF USING SAME

[75] Inventors: John H. Fankhauser, II, Del Mar; Thomas W. Todd, San Diego, both of Calif.

[73] Assignee: User Friendly Foods, Inc., San Diego, Calif.

[21] Appl. No.: 444,771

[22] Filed: Dec. 1, 1989

Related U.S. Application Data

[63] Continuation-in-part of Ser. No. 264,192, Nov. 28, 1988, which is a continuation-in-part of Ser. No. 111,104, Oct. 16, 1987, abandoned, which is a continuation-in-part of Ser. No. 622,995, Jun. 21, 1984, abandoned.

[51] Int. Cl.⁵ ............................................. A22C 25/16
[52] U.S. Cl. .......................................... 17/46; 17/11; 17/1 G
[58] Field of Search ................. 17/46, 11, 50, 21, 1 G

[56] References Cited

U.S. PATENT DOCUMENTS

| | | | |
|---|---|---|---|
| 3,296,654 | 1/1967 | Segur | 17/11 |
| 3,412,425 | 11/1968 | Sturm | 17/11 |
| 3,470,581 | 10/1969 | Hopkins | 17/11 |
| 3,510,908 | 5/1970 | Segur et al. | 17/11 |
| 3,581,337 | 6/1971 | Tonjum et al. | 17/46 |
| 4,327,463 | 5/1982 | Martin | 17/11 |
| 4,446,600 | 5/1984 | Hooley et al. | 17/11 |
| 4,495,675 | 1/1985 | Hill et al. | 17/1 G |
| 4,811,456 | 3/1989 | Heuvel | 17/11 |

*Primary Examiner*—Willis Little
*Attorney, Agent, or Firm*—Bernard L. Kleinke; William Patrick Waters; Jerry R. Potts

[57] ABSTRACT

A deboning system is adapted for use in separating intact the proximal and distal bones of a fowl wing and for removing the proximal bones substantially intact from the proximal portion to provide a comestible receiving cavity therewithin. The system includes a force applying disjointing unit for separating the proximal and distal bones at their connecting joint, and a deboning unit for removing the separated proximal bones from the fowl wing substantially intact to create the cavity in the deboned fowl wing.

17 Claims, 7 Drawing Sheets

DEBONING SYSTEM AND METHOD OF USING SAME

CROSS REFERENCE TO RELATED APPLICATIONS

This patent application is a continuation-in-part of copending U.S. Pat. application Ser. No. 07/264,192 filed Nov. 28, 1988, entitled "POULTRY SAUSAGE AND METHOD OF MAKING SAME," said application being assigned to the same assignee as the present application and being a continuation-in-part application of U.S. Pat. application Ser. No. 07/111,104, filed Oct. 16, 1987, entitled "CHICKEN AND METHOD OF MAKING SAME," which is now abandoned, which is a continuation-in-part application of U.S. Pat. application Ser. No. 06/622,995 filed June 21, 1984, entitled "CHICKEN SAUSAGE AND METHOD OF MAKING SAME," now abandoned.

DESCRIPTION

1. Technical Field

The present invention generally relates to poultry deboning devices and techniques. It relates more particularly to a deboning system for separating intact the proximal bones of a poultry wing from the distal bone of the wing, to create a comestible receiving cavity in the proximal portion of the wing, thereby facilitating the manufacturing of a stuffed poultry wing.

2. Background Art

The present invention relates to a system for deboning the proximal portion of a poultry wing to enable it to be stuffed with a comestible product such as a poultry sausage or the like. A conventional manual technique for deboning a poultry wing, together with an all natural poultry sausage stuffing, are disclosed in the above reference copending U.S. Pat. application Ser. No. 07/111,104.

While such a manual technique is satisfactory for removing the proximal bones intact from a poultry wing for some applications, it would be highly desirable to have a system and a method of de-boning poultry wings in a high speed and effective manner, according to modern high-speed manufacturing techniques. More particularly, care must be exercised to assure that the proximal bones are removed intact without leaving any rough or jagged edges in the casing proximal portion of the wing, which edges could injure a person who later consumes the wing after it is stuffed with a comestible and then prepared for consumption.

Therefore, there is a need for a high-speed and efficient poultry deboning system and method for using it, for maintaining a suitable high speed production rate. Such a system should insure, to a great extent, that the bones are removed intact, to avoid possible subsequent injury to a consumer.

DISCLOSURE OF THE INVENTION

Therefore, it is an object of the present invention to provide a new and improved deboning system and method in a fast and efficient manner.

It is another object of the present invention to provide such a new and improved system and method, which are able to remove the bones substantially intact.

Briefly the above and further objects and features of the present invention are realized by providing a new and improved deboning system and method, which is suitable for modern high speed manufacturing processes. The new system and method enables the bones to be removed substantially intact, in a fast and efficient manner.

The deboning system includes a force applying disjointing unit for separating the proximal and distal bones of a poultry wing at their connecting joint. A deboning unit removes the separated proximal bones from the poultry wing substantially intact to form a poultry wing casing.

In one form of the invention, forces are applied laterally to the bones to cause the separation at the joint. In another form of the invention, ultrasonic energy is applied longitudinally to the bones to cause the separation.

Thus, by separating cleanly the bones at the joint the present inventive deboning system enables the deboning of a poultry wing in a fast and efficient manner, so that poultry wing casings may be produced on a mass production basis. As a result, the bones are removed in a substantially intact manner, at a rapid rate of speed.

BRIEF DESCRIPTION OF DRAWINGS

The above mentioned and other objects and features of this invention and the manner of attaining them will become apparent, and the invention itself will be best understood by reference to the following description of the embodiments of the invention in conjunction with the accompanying drawings, wherein.

BEST MODE FOR CARRYING OUT THE INVENTION

Figure 1:
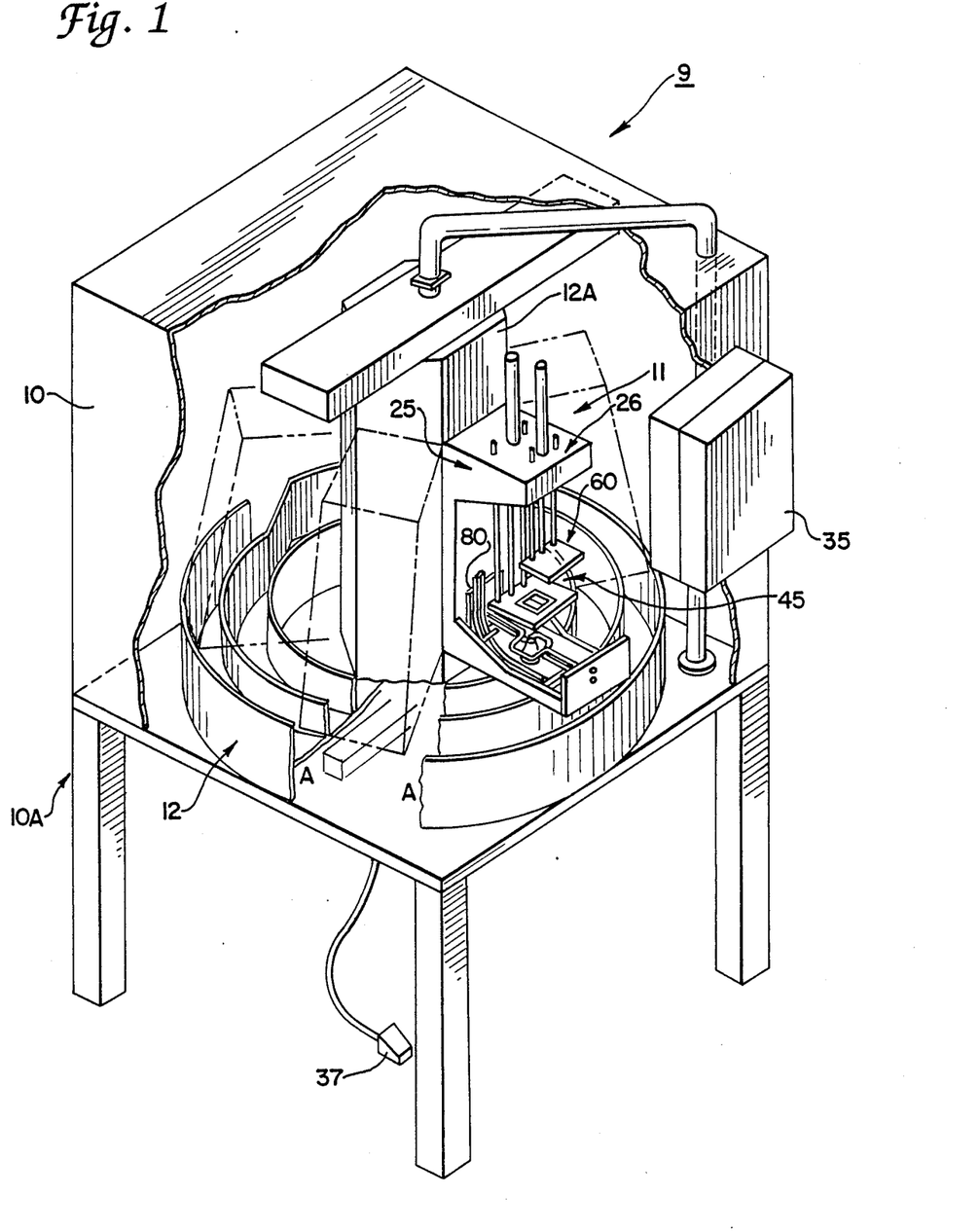
FIG. 1 is a partially broken away pictorial view of a deboning system, which is constructed in accordance with the present invention.
Figure 11:
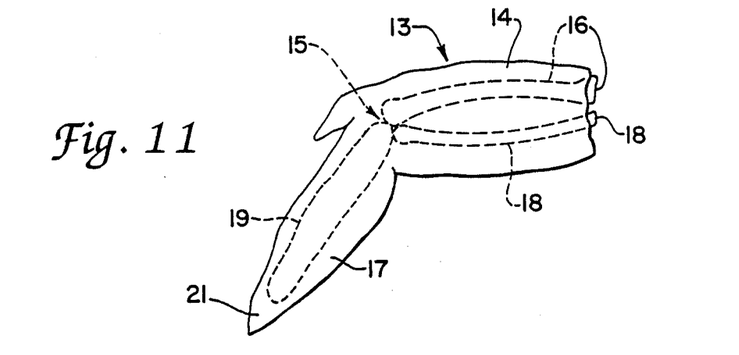
FIG. 11 is an enlarged diagrammatic view of a fowl wing at an initial stage prior to the deboning process.
Figure 13:
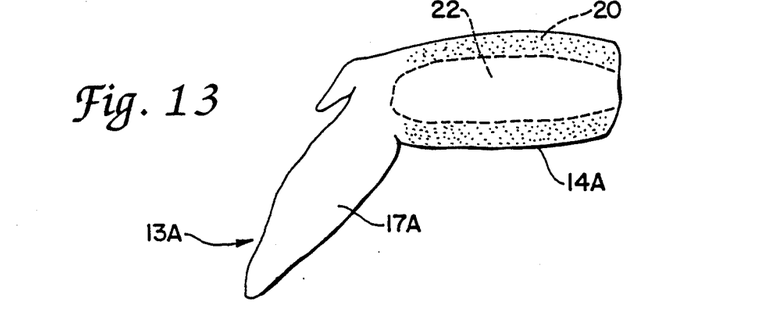
FIG. 13 is a view similar to FIG. 11, illustrating a deboned fowl wing.

Referring now to the drawings, and more particularly to FIG. 1 thereof, there is shown a deboning system 9, which is constructed in accordance with the present invention. As shown in FIGS. 11 and 13, the system 10 separates the distal and proximal bones, such as a pair of proximal bones 16 and 18 in a proximal end 14, and a distal bone 19 in a distal end 17 terminating in a tip 21, of a fowl wing, such as a chicken wing 13, at their connecting joint, such as a joint 15. The system 9 removes the proximal bones 16 and 18 from the proximal end 14. As shown in FIG. 13, a resulting deboned wing 13A is provided with a resulting comestible receiving cavity 22 (FIG. 13) surrounded by skin and a small residual amount of flesh, generally indicated at 20. The cavity 22 can be subsequently stuffed with a comestible (not shown), as explained in greater detail in the foregoing mentioned patent application Ser. No. 07/264,192.

For illustration purposes only, the system 9 is shown in use for deboning a chicken wing. However, it will become apparent to those skilled in the art, after reviewing the description herein, that the bones of other types and kinds of birds or fowls can be separated and removed according to the system and method of the present invention. Also, the bones may be removed from other portions of the bird or fowl, as well. For example, bones can be removed from the leg and thigh portions.

As shown in FIG. 1, the system 9 generally comprises a table or raised platform 10A, having a housing unit 10 mounted thereon for supporting a set of horizontally equally spaced apart, rotatable work stations, such as a work station 11. Each of the work stations are mounted to a rotatable base unit 12 which is disposed centrally within the housing unit 10. The base unit 12 enables the work stations to be indexed sequentially about a common central axis, as indicated by the arrows A—A in FIG. 1. A control unit or system 35 actuated by a foot pedal 37, enables a user (not shown) to advance the work stations during a deboning operation. Thus, each work station can function independently and simultaneously, to facilitate the speed and efficiency of production. As each work station is substantially similar to one another, only the work station 11 will now be described in greater detail.

Figure 2:
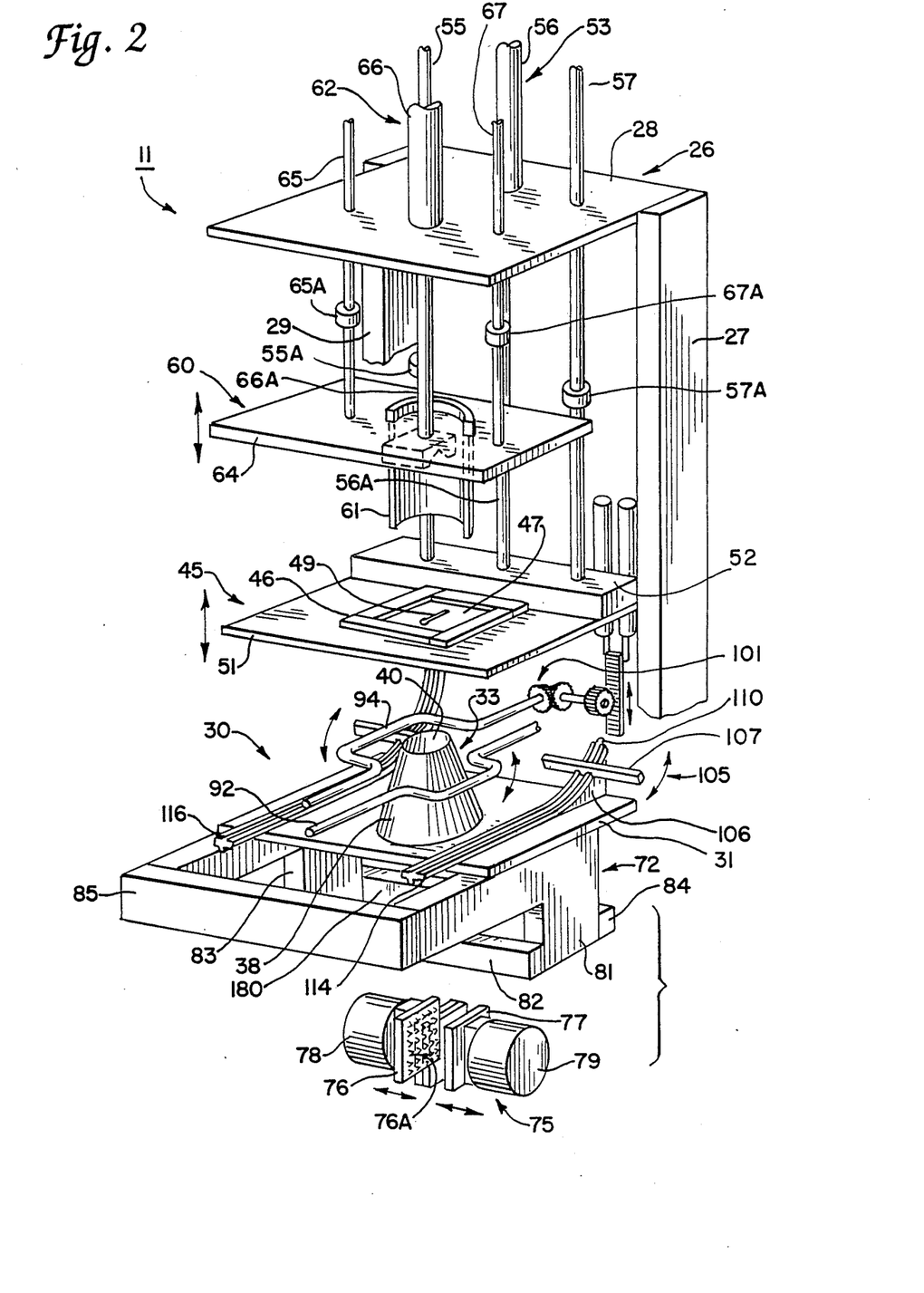
FIG. 2 is an enlarged fragmentary exploded pictorial view of a work station which forms a part of the deboning system of FIG. 1.
Figure 3:
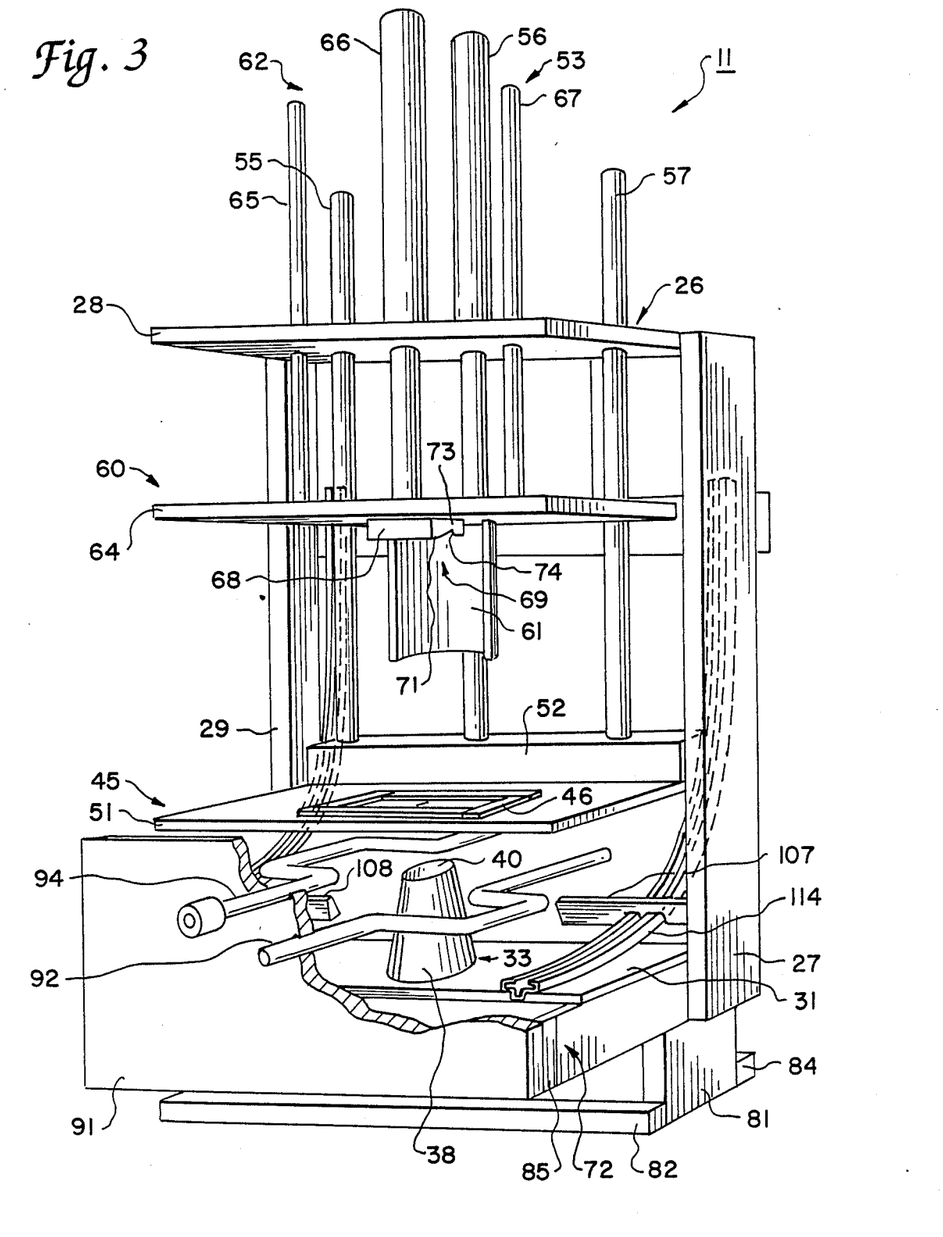
FIG. 3 is an enlarged fragmentary partially broken away pictorial view of the work station of FIG. 2, illustrating it in a poultry wing loading position.
Figure 4:
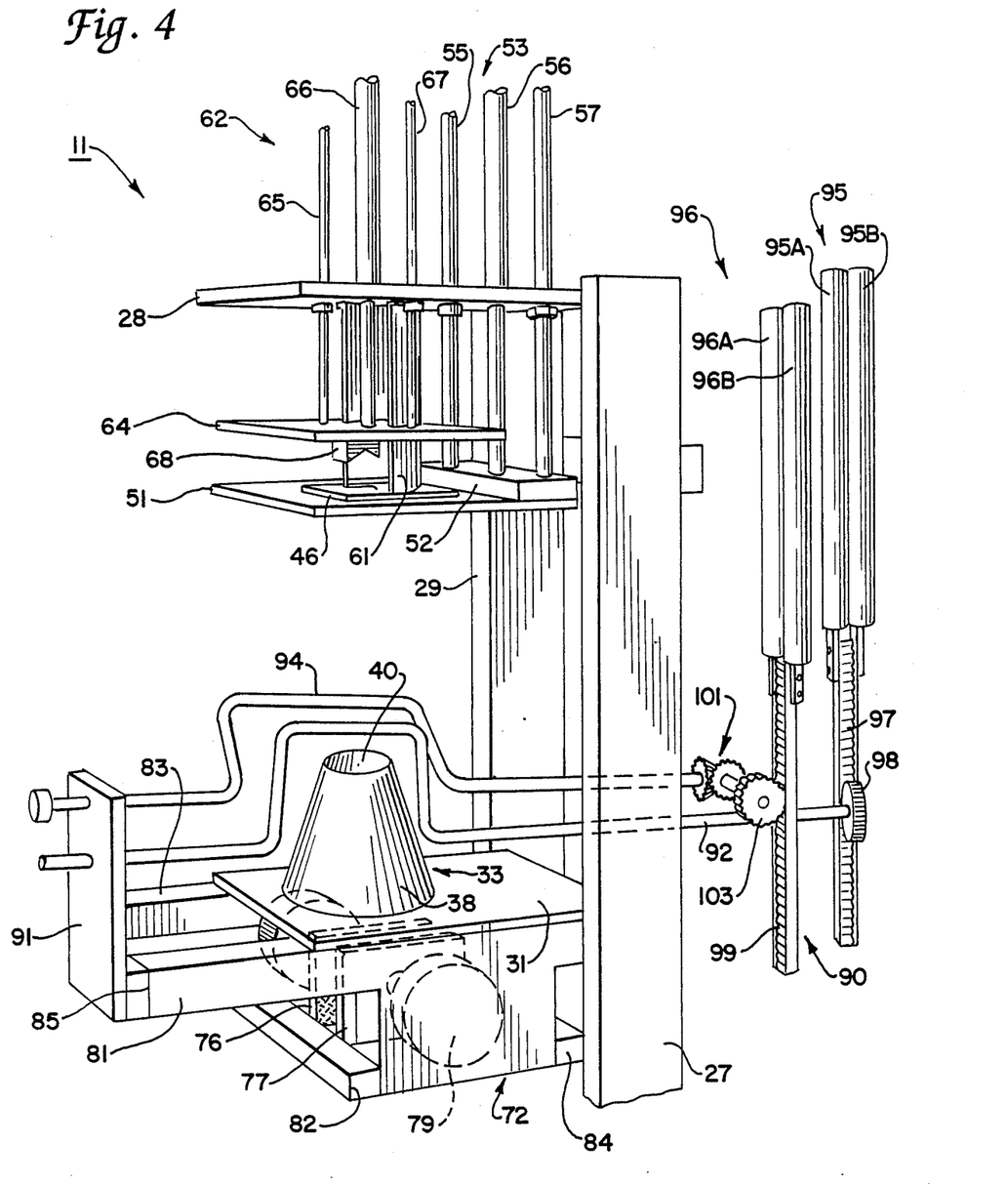
FIG. 4 is an enlarged fragmentary pictorial view of the work station of FIG. 2, shown in a bone separating position.

Considering now the work station 11 in greater detail with reference to FIGS. 2-4, the work station 11 generally comprises a base mounting assembly 25 for mounting the work station 11 removably to the rotatable base unit 12. The base mounting assembly 25 is mounted to an upstanding central core 12A of the unit 12, and includes a top plate assembly 26 for supporting the pneumatic controls as hereinafter described in greater detail, and a bone clamping cylinder assembly 75 at the underside thereof, for securing removably a chicken wing, such as the chicken wing 13 of FIG. 11, in an upright manner the work station 11 during the deboning operation, as will be explained hereinafter in greater detail with reference to FIGS. 6 and 7.

Figure 5:
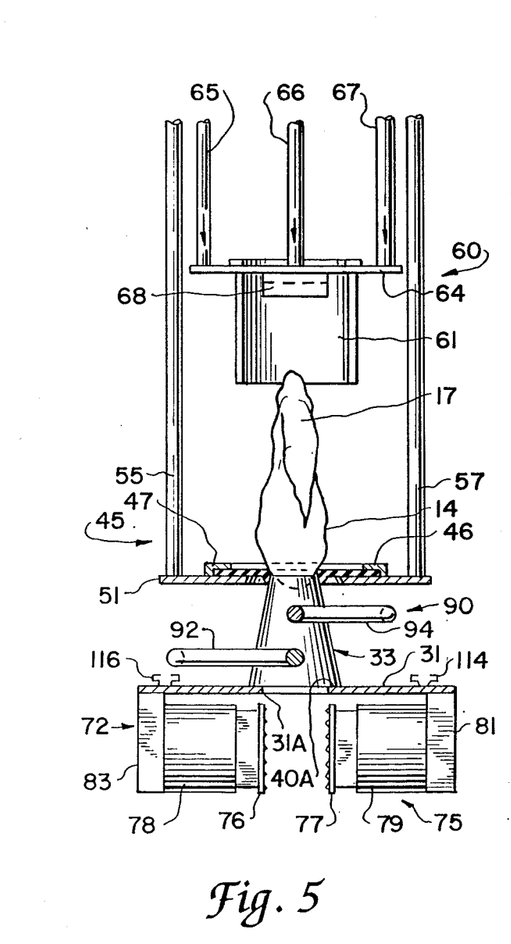
FIG. 5 is a fragmentary front pictorial view of the station of FIG. 2, illustrating an initial step in deboning a poultry wing.

As best seen in FIGS. 2 and 3, the work station 11 includes a wing holding assembly 30 that cooperates with a wing de-skinning or extending assembly 45 thereabove, for supporting the chicken wing 13 in an upright manner, as best seen in FIG. 5, during the deboning operation. The wing holding assembly 30 comprises a substantially flat horizontal base plate 31 for supporting from below a stripping unit 33 which removes a portion of the skin and flesh, as best seen at 20 in FIGS. 6 and 7.

The stripping unit 33 is in the form of an upright hollow tubular cone, and has a centrally disposed, horizontally extending upper circular opening 40 whose diameter is slightly smaller than the thickness of the proximal end portion 14 of the chicken wing 13 (FIG. 11). The unit may also be cylindrical in shape. In this regard, as shown in FIG. 5, the proximal end 14 of the chicken wing 13 rests on top of the unit 33, and is partially received within the opening 40 to be supported from below in an upright manner by the assembly 45 disposed slightly above the unit 33 during the initial steps of the deboning operation.

Figure 6:
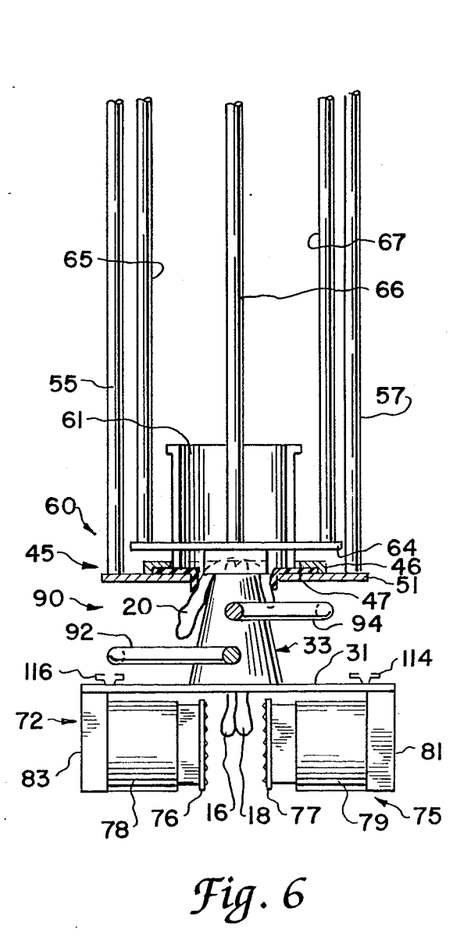
FIG. 6 is a view of the station, similar to FIG. 5, illustrating the next step of the deboning process.
Figure 7:
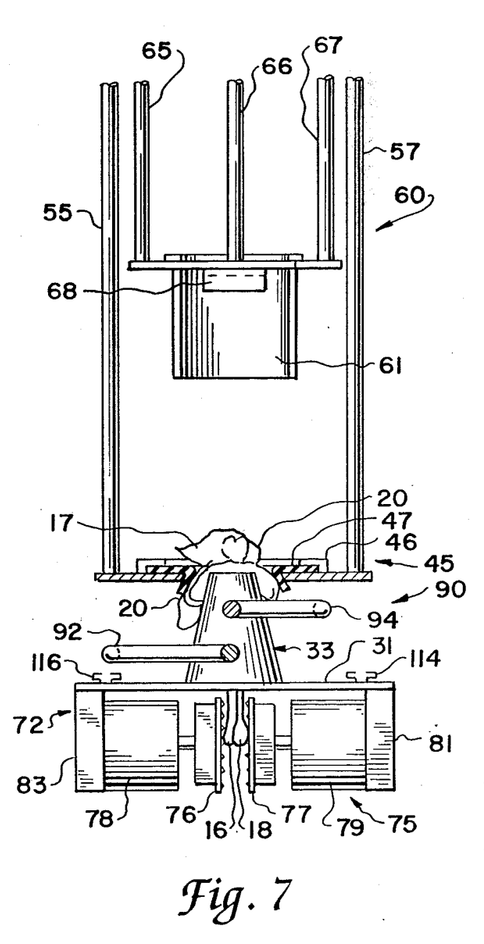
FIG. 7 is a view of the station, similar to FIG. 5, illustrating a subsequent step of the deboning process.

As shown in FIGS. 2, 3, 6 and 7, a vertically movable press assembly 60 forces the wing 13 downwardly against the unit 33 to cause the proximal bones 16 and 18 to be stripped of their surrounding flesh and protrude into the hollow interior of the unit 33 (FIG. 6). Thereafter, the assembly 75 grips the stripped bones at their lowermost ends (FIG. 7).

Figure 8:
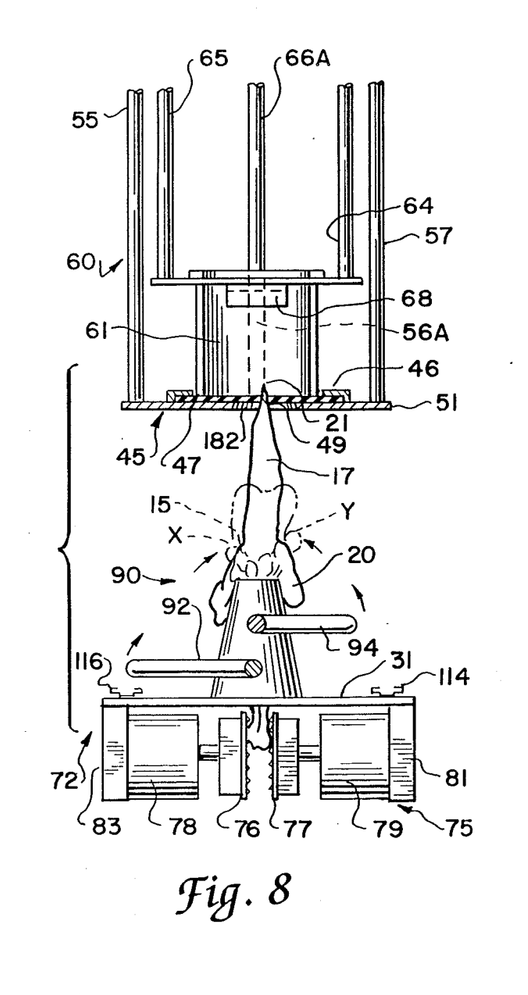
FIG. 8 is a view of the station, similar to FIG. 5, illustrating a subsequent step of the deboning process.

Subsequently, as shown in FIG. 8, the wing extending assembly 45 cooperates with the bone clamping assembly 75 to raise the distal end 17 of the chicken wing 13 to a substantially fully extended position for the following disjointing operation as will be explained hereinafter in greater detail.

Figures 9, 10:
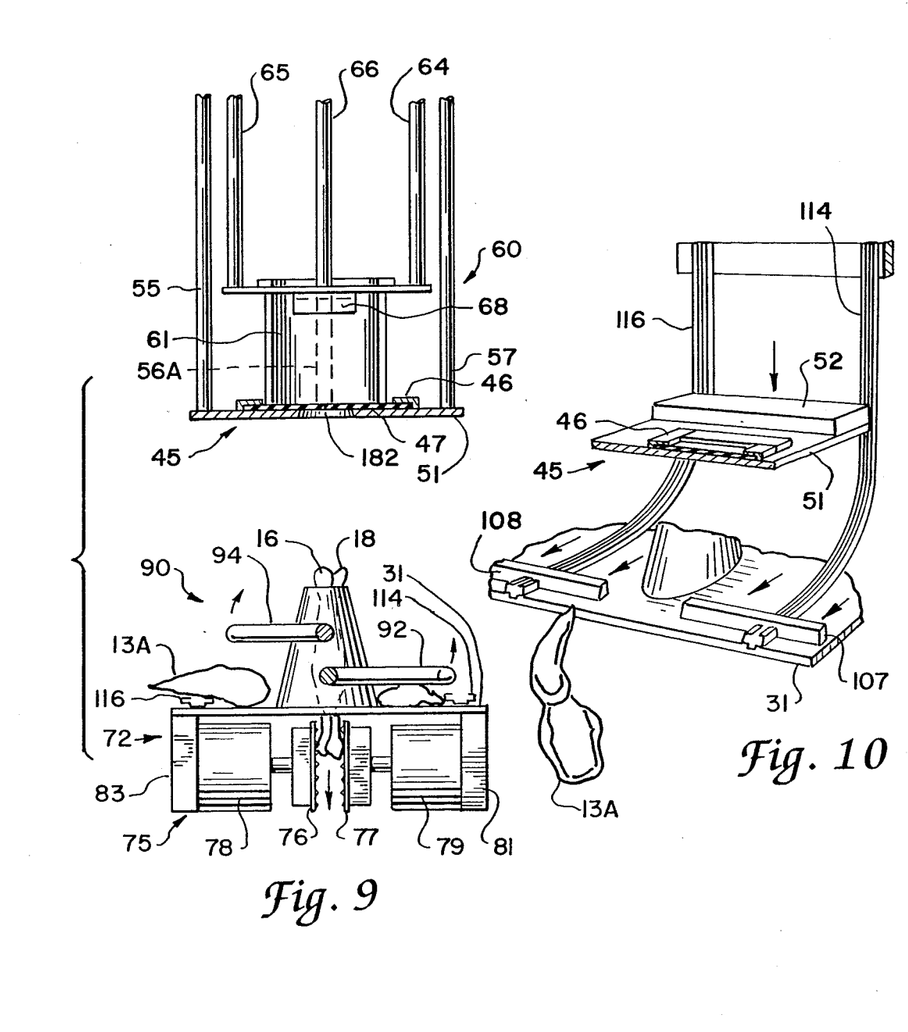
FIG. 9 is a view of the station, similar to FIG. 5, illustrating a subsequent step of the deboning process.
FIG. 10 is a fragmentary view of the station of FIG. 2, illustrating it in a subsequent step of the deboning process.

As best seen in FIGS. 8 and 9, a rotatable arm assembly generally indicated at 90 is positioned below the top opening 40 of the unit 33, and includes a pair of rotatable U-shaped arms or bars 92 and 94, for disjointing the proximal bones 16 and 18 from the joint 15, and for dislodging the deboned wing 13A from the unit 33 and the assembly 45. Arm 92 rotates in a clockwise direction to press against the joint 15 in a generally laterally directed manner to separate the proximal bones 16 and 18 from the distal bone 19. Arm 94 rotates in a counter clockwise direction to press against the distal end 17 of the chicken wing 13 to cause it to be released from the wing extending assembly 45 and to fall under the force of gravity into the top horizontal surface of plate 31.

As best seen in FIG. 2, 3, 8 and 9, the wing extending assembly 45 includes a wing supporting unit 46 with a resilient apertured resilient membrane member 47 to help roll back the skin and support the chicken wing 13 during the initial skin stripping operation, as well as the subsequent disjointing operation. As best seen in FIG. 2, the resilient membrane member 47 has a narrow elongated slit or opening 49 which is aligned axially with the opening 40. In this regard, during the loading operation, the proximal end 14 of the chicken wing 13 is inserted downwardly partially through the slit 49 and into opening 40. Slit 49 expands around the proximal end 14 of the chicken wing 13, and the membrane retracts thereabout to grip it for helping support the wing 13 in an upright manner above the unit 33. When the assembly 90 dislodges the deboned wing 13A from the membrane member 47, the wing 13A is pushed out of gripping engagement with the stretched member 47, which then snaps back to its normal unstressed condition shown in FIG. 2.

The vertically and reciprocatively movable press assembly 60 cooperates with the unit 33 of the holding assembly 30 to strip the skin and a small portion of the flesh of the proximal end 14 of the chicken wing 13 from the proximal bones 16 and 18 of the chicken wing. More particularly, the holding fixture or assembly 30 holds the proximal end 14 of the chicken wing 13 upright and stationary relative to the vertical path of travel of the press assembly 60.

As shown in FIGS. 2, 3 and 4, the press assembly 60 includes a pneumatic piston cylinder assembly 62 that moves a press plate 64 through its vertical path of travel reciprocatively towards and away from the holding fixture 30. As the press plate 64 is lowered forcibly toward the holding fixture 30 into a lowered position, the distal end of the proximal bones 16 and 18 are pressed in a generally downwardly directed path of travel to thrust the bottom ends of the proximal bones 16 and 18 from their surrounding skin and flesh 20 so they completely protrude therefrom (FIG. 6). When the press plate reaches the limits of its downward path of travel, the laterally movable bone clamp assembly 75 grips the stripped bones firmly, and the holding assembly 30 supports the remaining portion of the wing thereabove. The assembly 75 holds the bones in place to facilitate the subsequent wing straightening operation (FIG. 8), as well as the subsequent disjointing operation (FIGS. 8 and 9).

As shown in FIGS. 2 and 4, the bone clamp assembly 75 includes a mounting unit generally indicated at 72 for supporting a pair of normally spaced apart gripper plates 76 and 77 for movement toward and away from one another below a bottom opening 40A of the unit 33 and an aligned hole 31A in the base plate 31 (FIG. 5) relative to the holding fixture 30.

The next position of the press assembly 60 illustrated in FIG. 7, is generally referred to as the intermediate position where the press plate 64 is retracted upwardly back to its initial starting position to enable the distal end 17 of the chicken wing to be raised in preparation for the disjointing operation, as will be explained hereinafter in greater detail. As best seen in FIG. 8, the next position of the wing retaining assembly 45 is the raised or disjointing position where the folded back distal end skin 20 is raised upwardly relative to the clamped proximal bones 16 and 18 to permit the proximal bones 16 and 18 and the distal bone 19 to be disjointed. A horizontal movable guide plate 51 is driven by a piston rod 55A (FIG. 8).of a piston cylinder assembly 55 of a pneumatic mechanism 53 (FIG. 2) to move away from and toward the holding fixture 30. As the guide plate 51 is raised away from the holding fixture 30 toward the disjointing position (FIG. 8), the proximal skin 20 of the proximal end 14 is raised upwardly and partially pulled upwardly through opening 49 and below the guide plate 51. As the guide plate 51 continues in its upward path of travel, the distal end 17 of the chicken wing is extended through opening 49 and retained or supported by the guide member 47. At the uppermost or separating position, the wing 13 is substantially fully extended with the tip portion 21 of the distal end 17 of the wing 13 gripped within the slit 49 in preparation for the disjointing operation.

As illustrated in FIGS. 3 and 4, the pair of U-shaped arms 92 and 94 snap, stretches or pop the proximal bones from the joint 15 to disengage the proximal bones 16 and 18 from the distal bone 19. A pair of pneumatic mechanisms 95 and 96 move the arms 92 and 94 respectively forcefully through their oppositely directed approximate 180° paths travel sequentially toward and away from the wing. The lower arm 92 has a path of travel below the upper arm path of travel, and presses laterally forcibly against the joint 15 of the chicken wing 13. In this regard, as arm 92 engages and press forcefully against the extended wing to exert a laterally directed pressing force against the proximal end of the distal bone 19 at a position X above the joint 15 against the wing 13 to move the distal bone relative to the clamped bones 16 and 18. As a result, the distal bone 19 and the proximal bones 16 and 18 completely separate at the joint 15, but the bones remain substantially intact. If the proximal bones do not separate from the distal bone, then the arm 92 remains at position X, and then the arm 94 rotates or swings about a horizontal axis above the lower horizontal axis of the arm 92, and engages the deboned chicken wing 13A at the opposite side thereof at Y. In this regard, the arm 94 applies a lateral force in opposition to the lower lateral force applied by the arm 92 serving as a fulcrum. This action completes the desired separation.

As arm 94 engages the deboned chicken wing 13A, the laterally directed pressing force against the distal bone 19 causes the deboned chicken wing to be dislodged from the membrane member 47, and thus causes the wing to fall under the force of gravity onto the top surface of base plate 31. When arm 94 reaches the limit of its path of travel, it is reciprocated back to its initial starting position.

If the arm 92 is unsuccessful in disjointing the bones, then the arm 94 may then be successful in the separation of the bones at the joint. Once the deboned wing is dislodged, the clamp assembly releases the stripped bones 16 and 18 which then fall away from the unit 33 to a disposal area (not shown). The gripper plates are then in the initial position shown in FIG. 5.

As illustrated in FIGS. 2 and 3, a sweeper assembly 105 is mounted relative to the holding fixture 30 for sweeping the deboned chicken wing 13A from the base plate 31 through an opening 180 in the mount unit 72 into a receptacle (not shown). The sweeper assembly includes a pair of sweeper arms 107 and 10B which are slidably mounted to guide channels 114 and 116 respectively. A pair of stiff, flexible straps or wire, such as the strap 110 (FIG. 2) are disposed within each respective channel 114 and 116, and are connected between the wing retaining assembly 45 and each respective sweeper arm. In this regard, as guide plate 51 is raised, the sweeper arms 107 and 108 move across the top surface of base plate 31. Similarly when guide plate 51 is lowered back to its initial resting position above the holding assembly or fixture 30, the sweeper arms 107 and 108 again sweep across the top surface of base plate 31, thus causing the deboned chicken wing 13A resting on base plate 31 to be pushed off of the edge of the plate 31, to permit the wing to fall through the opening 180 (FIG. 2).

In operation, in order to debone the wing of a fowl without substantial fracturing or breaking the wing bones of the fowl, a user causes the wing retaining assembly 45 to be lowered toward the holding fixture or assembly 30 to a loading position where the resilient guide member membrane 47 is positioned directly over opening 40 of the stripping member 33. The proximal end 14 of the chicken wing 13 is then inserted into the stripping member 33 via opening 49 in the membrane member 47. The press assembly 60 is then lowered to a stripping position where the press plate 64 causes the proximal bones 16 and 18 of the chicken wing to be thrust from the skin and flesh 20 and completely protrude therefrom. Thereafter, the bone clamping assembly 75 is moved to a clamping position where it firmly grips or clamps the protruding proximal bones 16 and 18 holding them in an upright stationary position. Once the proximal bones 16 and 18 have been secured, the press plate assembly 60 is retracted to its initial starting position, to permit the wing retaining assembly 45 to be subsequently raised.

Subsequently the wing retaining assembly 45 is raised to a separating position where a portion of the proximal flesh 20 and the distal end 17 of the wing is raised upwardly by the guide plate 51. As the guide plate 51 is raised away from the holding fixture 30, that portion of the proximal flesh 20 of the wing above membrane 47 is raised upwardly and pulled through opening 49 below the guide plate 51. As the guide plate 51 continues in its upward path of travel the distal end 17 of the chicken wing 13 is partially pulled through opening 49 and extended therethrough and retained or supported by the guide member membrane 47. At the uppermost or separating position the tip portion 21 of the distal end 17 is firmly retained in slit 49 while the proximal bone 16 and 18 are firmly gripped or clamped from below in the bone clamping assembly 70 thus extending the chicken wing 13 in preparation for the disjointing operation.

Once the chicken wing 13 has been extended between the wing retaining assembly 45 and the bone clamping assembly 75, the disjointing arm 92 of the disjointing assembly 90 is rotated clockwise and pressed laterally against the proximal end of the distal bone 19 to force joint 15 to disjoint leaving both the distal bone 19 and the proximal bones 16 and 18 completely separated but intact. Thereafter, the dislodging arm 94 is rotated counterclockwise and pressed laterally against the distal end 17 of the now deboned chicken wing 13A which forces the deboned chicken wing 13A to be dislodged from the membrane member 47 causing it to fall under the force of gravity onto the top surface of base plate 31 in preparation for the sweeping operation.

Subsequently the sweeping assembly 105 is moved to a sweeping position when the wing retaining assembly 45 is lowered to the loading position. As the wing retaining assembly 45 is lowered to the loading position the sweeper arms 107 and 108 sweep across the top surface of the base plate, thus moving the deboned chicken wing 13A resting on base plate 31 off the holding fixture and into the receiving receptacle (not shown).

Considering now the base mounting assembly 25 in greater detail with reference to FIGS. 2–4, the base mounting assembly includes a pair of spaced apart support columns 27 and 29 which are secured to the rotatable base unit 12 by means (not shown). The top plate assembly 26 and the bone clamping assembly 75 are disposed between columns 27 and 29 and supported thereby to permit the assemblies 26 and 70 to be rotated in the $\Theta_z$ direction for mass production purposes.

Considering now the top plate assembly 26 in greater detail with reference to FIGS. 2–4, the top plate assembly 26 generally comprises a support plate 28 for supporting piston cylinder assemblies 53 and 62. Support plate 28 is a substantially flat thin rectangularly shaped plate that is rigidly secured between the support columns 27 and 29. The piston cylinder assemblies 53 and 62 extend perpendicularly in respective openings in the support plate 28 to guide and drive the wing retaining assembly 45 and the bone pressing assembly 60 relative to one another in their respective vertical paths of travel.

Considering now the bone clamping assembly 75 in greater detail with reference to FIGS. 2–4, the mounting unit 72 generally comprises a pair of L-shaped frame members 81 and 83, and an elongated bar-shaped interconnecting bight member 85 which form a substantially flat supporting for the wing holding assembly 30. A pair of elongated spaced apart rails 82 and 84 extend between frame members 81 and 83 for helping to support and releasably secure by means (not shown) a pair of bidirectional cylinder units 78 and 79 for moving between an open and a clamping position the clamping or gripping plates 76 and 77. In this regard, cylinder unit 78 is connected to plate 76 by means (not shown) for moving plate 76 toward and away from plate 77. Similarly, cylinder unit 79 is connected to plate 77 by means (not shown) for moving plate 77 toward and away from plate 76. In this manner, plates 76 and 77 may be moved towards each other to firmly grip and hold the protruding proximal bones 16 and 18 when they are disposed therebetween as will be explained in further detail hereinafter. Plates 76 and 77 are substantially similar to one another so only plate 76 will be described hereinafter in greater detail.

Considering now plate 76 in greater detail with reference to FIGS. 2 and 4, plate 76 is a generally rectangularly shaped plate which is disposed between rails 82 and 84. Plate 76 includes a bone gripping surface shown generally at 76A, composed of a plurality of spaced apart protrusions which are adapted for slightly penetrating a surface material, such as a bone. In this regard, the protrusions cooperate together to penetrate bones 16 and 18 for helping to facilitate the gripping of the bones when plates 76 and 77 are moved into the clamping position.

Considering now the wing holding assembly 30 in greater detail with reference to FIGS. 2–4, the base plate 31 is of a substantially flat rectangularly shaped configuration and is removably mounted on the uppermost surface of the bone clamping assembly 75 between frame members 81 and 83. Plate 31 includes an opening 31A which is dimensioned to receive and guide the proximal bones 16 and 18 when pushed from the proximal flesh 20 to a position substantially between plates 76 and 77.

Considering now the stripping unit 33 in greater detail with reference to FIGS. 2–4, the stripping unit 33 is generally frustrum shaped and has a unitary structure and rigid metallic composition. The stripping unit 33 is hollow through its structure having a single sidewall 38. The portion of the stripping unit 33 includes a small upper opening 40 which is dimensioned to be slightly smaller then the width or thickness of the proximal end 14 of the chicken wing 13. In this regard, when the end portion of the proximal end 14 of the chicken wing 13 inserted into opening 40 the sidewall portion 38 supports the proximal end 14 in opening 40 and permits the proximal bones 16 and 18 to pass therethrough. However, by reason of the top opening 40 being smaller than the width or thickness of the proximal end 14, the outer layer of skin and flesh of the proximal end 14 of the wing are stripped off the bones 16 and 18 as they pass through opening 40 under the longitudinally directed force exerted by press plate 64 as it moves vertically downwardly toward the stripping unit 33. It should be understood that the outer layer of skin and flesh when stripped from the proximal bones 16 and 18 stops on the upper surface of the membrane member 47.

Considering now the press plate assembly 60 in greater detail with reference to FIGS. 2–4, 8 and 9, the pneumatic mechanism 62 includes a pair of grind rods 65 and 67 connected to plate 64 and that are disposed about a piston cylinder assembly 66, for moving reciprocatively the press plate assembly 60 in a generally vertical direction. A set of piston stops 65A and 67A are disposed on the respective rods 65 and 67 for limiting the upward vertical movement of the press plate assembly 60 (FIGS. 8 and 9). The piston cylinder assembly includes a piston rod 66A which is connected to plate 64. In this regard, as the piston rod 66A extends and retracts it moves the plate 64 in its generally vertical path of travel.

Press plate assembly 60 also includes an axially slidably mounted U-shaped shield 61 that engages the wing retaining assembly to help confine the chicken wing 13 to the general area of the membrane member 47.

For the purpose of causing the proximal end 14 of the chicken wing 13 to be pressed downwardly partially through the top opening 40, a guide block 68 is mounted on the underside of plate 64 directly below the piston rod 66A and in vertical alignment with opening 40. The guide block 68 includes a cut out irregular V-shaped cup portion 69 having a long side portion 71 and a short side portion 74. The long side portion 71 and the short side portion 74 join together at an apex 73 which is perpendicular to slit 49 and centrally traverse its longitudinal axis. In this regard, cup 69 engages the distal end of the proximal end 14 of the chicken wing 13 and helps to guide the proximal bones 16 and 18 through opening 40.

Considering now the wing retaining assembly 45 in greater detail with reference to FIGS. 2-4, the pneumatic mechanism 53 includes a substantially flat block 52 that interconnects a pair of guide rods 55 and 57 disposed about a piston cylinder assembly 56 for moving reciprocatively the wing retaining assembly 45 in a generally vertical direction. A set of piston stops 55A and 57A are disposed on the respective guide rods 55 and 57 for limiting the upward vertical movement of the wing retaining assembly 45 to align the arms relative to opening 40. The piston cylinder assembly 56 includes a piston rod 56A which is attached to plate 51. In this regard, as the piston rod 56A extends and retracts it moves the plate 56A in its generally vertical path of travel.

Considering now plate 51 in greater detail with reference to FIGS. 2 and 3, plate 51 includes a central disposed generally opening 182 for permitting the proximal end 14 of the chicken wing to pass therethrough. Opening 182 is generally vertically aligned with opening 40.

Considering now the bone disjointing assembly 90 in greater detail with reference to FIGS. 5-9, the pneumatic mechanism 95 includes a pair of piston cylinder assemblies shown generally at 95A and 95B, which are connected to base mounting assembly 25 by means (not shown). The piston cylinder assemblies 95 and 96 are connected to a race 97 moved reciprocatively in a generally vertical direction. A pinion 98 disposed on one of the terminal ends of are 92 and engages the rack 97 for transmitting reciprocatively rotary motion to arm 92. In a similar manner, pneumatic mechanism 96 includes a pair of piston cylinder assemblies shown generally at 96A and 96B that are connected to the base mounting means by means (not shown). The cylinder assemblies 96A and 96B are connected to a rack 99, which is moved reciprocatively in a generally vertical direction.

A gear arrangement, shown generally at 101, is disposed between arm 94 and a pinion 103, which engages rack 99. In this regard, as rack 99 is moved reciprocatively in a generally vertical direction the pinion and gear arrangement transmit a reciprocatively rotary motion to arm 94. Pinions 98 and 103 and the gear arrangement 101 are supported by a cross bar member 80 disposed between support columns 27 and 29.

For the purpose of supporting arms 92 and 94, the disjointing assembly 90 also includes a support plate 91 which is rigidly secure to the mounting unit 72 of the bone clamping assembly 70. The U-shaped arms 92 and 94 each extend perpendicularly in respective openings in the support plate 91.

Considering now the sweeper assembly 105 in greater detail with reference to FIG. 2-4, the sweeper assembly includes a pair of substantially triangularly shaped risors, such as risor 106 for raising the respective guide channels 114 and 116 above the top surface of base plate 31. The raisers are secured to base plate 31 by means (not shown) and are disposed in a parallel spaced apart manner. Each riser is adapted to receive and support a portion of the respective guide channels 114 and 116. As guide channels 114 and 116 are substantially similar only channel 114 will be described hereinafter in greater detail.

Considering now guide channel 114 in greater detail with reference to FIGS. 2-4, guide channel 114 is secured to the top surface of plate 31 by means (not shown). The guide strap 110 is disposed within channel 114 and moves reciprocatively relative to the vertical movement of the wing retaining assembly 45. In this regard, strap 110 is interconnected to the wing retaining assembly 45 by means (not shown).

Figure 12:
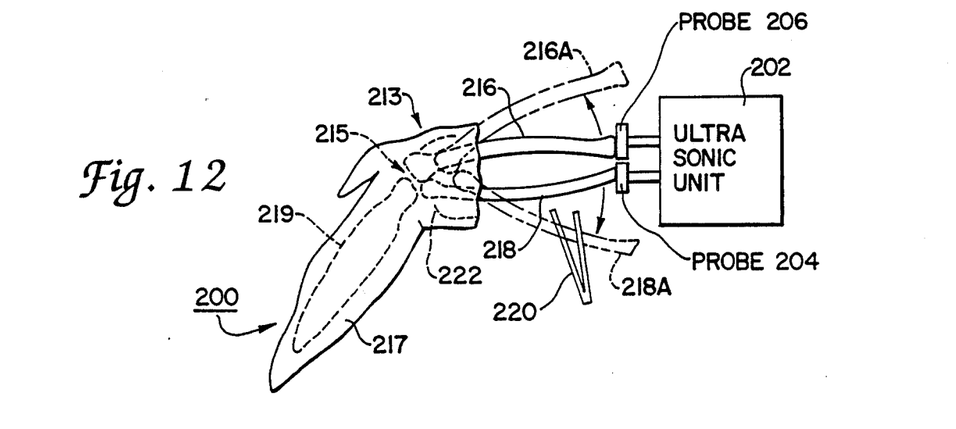
FIG. 12 is a diagrammatic, fragmentary view of another deboning system, which is also constructed according to the present invention, illustrating a fowl wing in the process of being deboned.

Referring now to FIG. 12, there is illustrated another poultry deboning system 200 which is constructed in accordance with the present invention, and which is illustrated in the process of deboning a chicken wing 213. The deboning system 200 generally comprises an ultrasonic force applying unit 202 for applying bone separating forces along the proximal bones 216 and 218 of the chicken wing 213. A pair of probes, such as probes 204 and 206 are energized by the force applying unit 202 and engage the free ends of the proximal bones 216 and 218 for directing the bone separating forces along the longitudinal axis of the proximal bones and toward a connecting joint 215 which joins the proximal bones 216 and 218 with a distal bone such as a distal bone 219. In this regard, bone separating forces generated by the force applying unit 202 are ultrasonic forces which cause a longitudinally extending vibrations in the proximal bones 216 and 218 to dislodge them from the distal bone 219 and violently swings the proximal bones, once disjointed, into the positions shown in fathom lines in FIG. 12.

The ultrasonic vibrations or impulses travel longitudinally along the proximal bones and meet at the joint 215 to cause a violent reaction, which causes the bones to jerk loose from the distal bone. Thus, the desired separation results.

For the purpose of removing the disjointed proximal bones 216 and 218 from the chicken wing 213, the deboning system 200 also includes a bone removing device, such as a tweezers 220. In this regard, a user (not shown) grips either one of the disjointed proximal bones, such as bone 216, with the bone removing device 220 and extracts the bone by pulling the bone out of the proximal end of the chicken wing 213. The bone removing device 220 is then used to grip the other proximal bone, such as bone 28, to extract it from the chicken wing 213 in a similar manner. When the proximal bones 216 and 218 have been extracted, a cavity, such as cavity indicated at 222 is thereby created in the chicken wing 213. The cavity 222 is similar to the cavity 22 of the wing 13A of FIG. 13, and may be filled with a comestible product (not shown).

Considering now the force applying unit 202 in greater detail with reference to FIG. 12, in the preferred form of the present invention, the force applying unit 202 if an ultrasonic generator having connected thereto the ultrasonic probes 204 and 206 for transferring the generated ultrasonic energy from the ultrasonic generator 202 to the proximal bones 216 and 218 of the chicken wing 213.

While particular embodiments of the present invention have been disclosed, it is to be understood that various different modifications are possible and are contemplated within the true spirit and scope of the appended claims. For example, it will become apparent to those skilled in the art that the ultrasonic arrangement of FIG. 12, may also be utilized as an adjunct to the system 9, to help perform the bone separating function of the arms 92 and 94. There is no intention, therefore, of limitations to the exact abstract or disclosure herein presented.

What is claimed is:

1. A system for removing proximal bones from fowl wings, comprising:
    means defining a small opening, said opening being smaller than the proximal end of the fowl wing;
    means for moving the proximal end of the fowl wing through said opening for stripping a portion of the flesh and its covering skin from the proximal bones;
    means for gripping said stripped proximal bones;
    means for retracting the distal end of the fowl wing away from said opening to extend the fowl wing; and
    means for pressing forcibly against the distal end of the extended fowl wing near the proximal bones to disjoint the proximal bones from the fowl wing.

2. A system according to claim 1, wherein said means defining a hole includes holding means for supporting the proximal end of the fowl wing.

3. A system according to claim 2, wherein said holding means is a hollow frustrum for holding the proximal end of the fowl using an upright manner.

4. A system according to claim 3, wherein said means for moving includes rectilinear movement means for causing movement of the proximal bones in a rectilinear directed path along a substantially vertical axis for stripping a portion of the flesh and its covering skin from the proximal bones.

5. A system according to claim 1, wherein said means for gripping includes a cylinder mechanism and a pair of gripper plates.

6. A system according to claim 1, wherein said gripper plates each include a plurality of spaced-apart protrusions for engaging the proximal bones.

7. A system according to claim 4, wherein said means for retracting includes gripper means for holding from above the distal end of the fowl wing as the retracting means subsequently reciprocally move along said rectilinear path of travel for extending the fowl wing.

8. A system according to claim 7, wherein said means for pressing forcibly against the distal end of the extended fowl wing includes a pair of rotatably mounted arms.

9. A system according to claim 8, wherein said arms are U-shaped arms that move in a co-planar path relative to one another.

10. A system according to claim 7, wherein said arms exert a laterally direct pressing force against said distal end of the fowl wing.

11. A method for removing proximal bones from fowl wings comprising:
    using a small opening, said opening being smaller than the proximal end of the fowl wing;
    moving the proximal end of the fowl wing through said opening to strip a portion of the flesh and its covering skin from the proximal bones;
    gripping the proximal bones to hold the bones stationary;
    extending the fowl wing to a substantially fully extended position;
    pressing the distal end of the fowl wing forcefully in a lateral direction near the proximal bones to disjoint the proximal bones; and
    moving the distal end of the fowl wing away from the disjointed proximal bones.

12. A system for removing the proximal bones from fowl wings, comprising:
    means for applying a joint separating force to disjoint the proximal and distal bones of the fowl wing from one another; and
    means for removing the disjointed proximal bones from the fowl wing.

13. A system according to claim 12, wherein said means for applying a joint separating force includes a force applying unit for directing a force along the longitudinal axis of the fowl wing.

14. A system according to claim 13, wherein said force applying unit is an ultrasonic generator having a pair of probes for engaging the proximal bones of the fowl wing.

15. A system according to claim 12, wherein said means for removing the disjointed proximal bones including clamping means for securing removably the proximal bones.

16. A system for removing the proximal bones of a fowl wing according to claim 12, further comprising:
    holding means for supporting the proximal end of the fowl wing, said holding means including a small opening to receive the proximal end of the fowl wing therein;
    press means for forcefully moving the proximal end of the fowl wing through said opening to create a cavity in the proximal portion of the fowl wing;
    means for extending the fowl wing to a fully extended position, said means for extending including means for securing the proximal bones of the fowl wing relative to the distal bones of the fowl wing, and means for retaining the tip portion of the distal end of the fowl wing; and
    said means for retaining being movable in a rectilinear directed path for moving the distal portion of the fowl wing in an upright substantially parallel plane to the proximal portion of the fowl wing.

17. A system according to claim 16, wherein said means for applying a joint separating force includes a force applying unit for directing a lateral force to the distal bone of the fowl wing adjacent the proximal bones.

* * * * *